2,918,973
PERFORATION CLEAN OUT TOOL

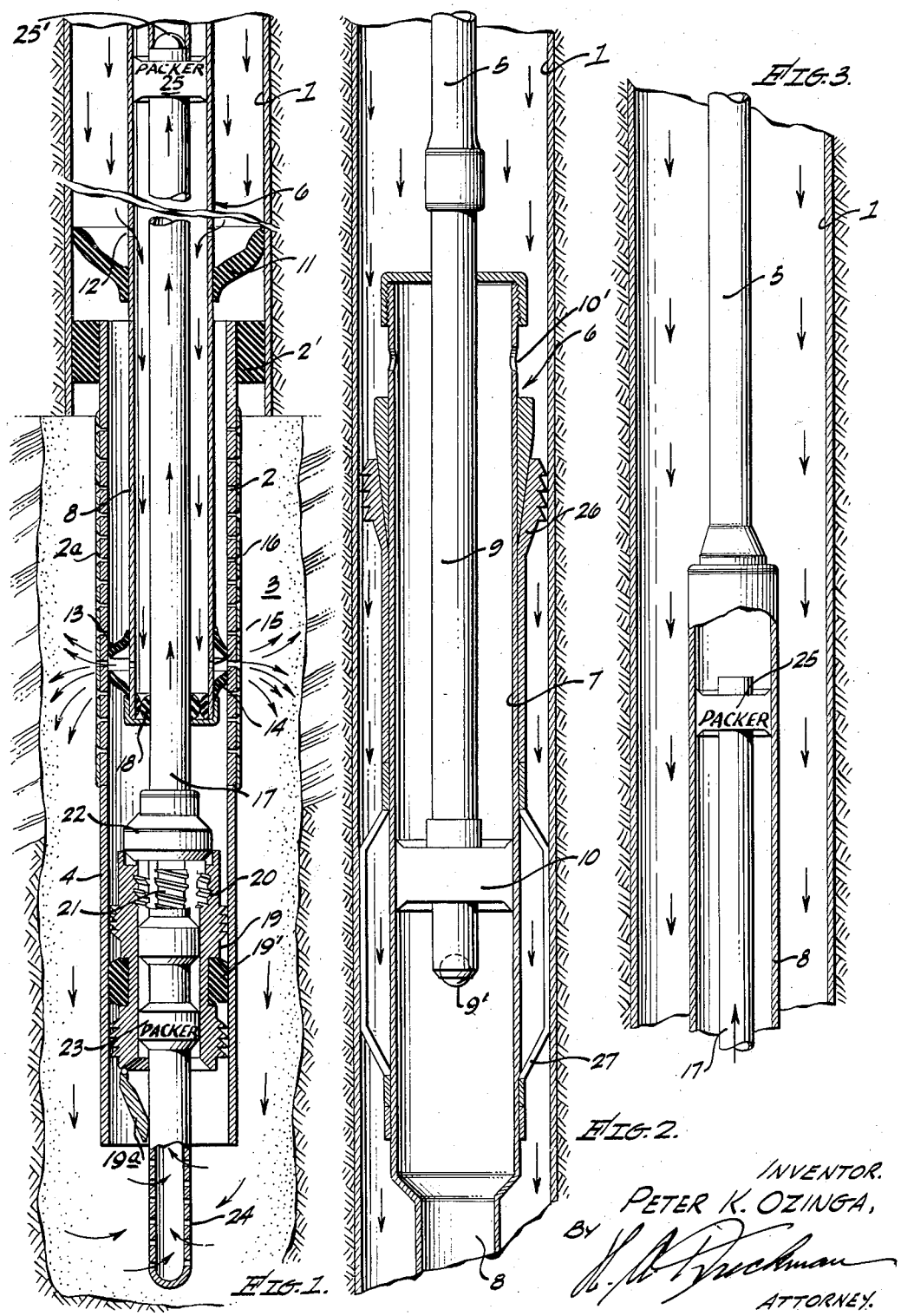

Peter K. Ozinga, Whittier, Calif.

Application October 16, 1953, Serial No. 386,615

8 Claims. (Cl. 166—171)

This invention relates to a tool whereby the perforated portion of the casing or the screen may be effectively cleaned, that is, dirt or other material may be effectively washed out of the perforations through which an oil well is produced.

In tools of this type heretofore in use, it was impossible to establish circulation throughout the entire length of the perforated pipe or screen or of the annulus behind the screen or pipe.

Furthermore, these devices previously in use do not provide any means by which solids which have been obstructing the perforations in the pipe or screen can be removed from the annular space back of the screen or pipe without passing them through the same screen openings which are intended to be cleaned or washed and which must ultimately serve for production of the well.

An object of my invention, therefore, is to provide a novel perforation washing tool which will effectively and properly wash and clean the outside of the screen as well as the perforations in that screen.

A further object of my invention is to provide a novel washing tool of the character stated which will effectively remove the solids which have been plugging or obstructing the perforations in the pipe or screen.

A feature of my invention resides in a means of passing clean wash fluid through the screen openings from the inside outwardly, thereafter passing the fluid downwardly through the annular space around the screen and then passing the wash fluid through a perforated shoe below the screen and then carrying the fluid upwardly to the surface.

Another feature of my invention is to provide a tool of the character stated in which the wash fluid together with the entrained solids to be removed from the annular space are pumped to the surface by the washing tool itself, thus reducing hydrostatic pressure on the formation and without passing the wash fluid back through any of the screen openings. The wash fluid returns through provided outlet ports which are arranged below the perforated pipe or screen.

Other objects, advantages and features of invention may appear from the accompanying drawing, the subjoined detailed description and the appended claims.

Figure 1 is a fragmentary longitudinal sectional view of the lower portion of my washing tool.

Figure 2 is a fragmentary longitudinal sectional view of the upper portion of my washing tool.

Figure 3 is a fragmentary longitudinal sectional view of a slightly modified form of the upper portion of my washing tool.

Referring more particularly to the drawing, the numeral 1 indicates the usual casing which is set within the bore of the oil well. A perforated pipe or screen 2 is positioned below the casing 1 and is suitably cemented or packed off as at 2', all of which is usual and well known in the art. The screen 2 is positioned within the producing formation of the oil well and an annular space 3 surrounds the screen 2, this annular space permitting oil to accumulate and then flow through the holes or perforations of screen 2. A woven screen 2' may surround the pipe screen 2 for the purpose of preventing intrusion of coarse sand, rocks, etc. This wire screen wrapping is usual in the art. A plain or unperforated portion 4 of the screen 2 projects below this screen and is also positioned within the annular space 3 of the bore of the oil well. A drill pipe or tubing 5 is run into the oil well and this pipe or tubing is coupled to the wash tool 6 in the following manner: In the form of my invention shown in Figures 1 and 2 a pump barrel 7 forms the upper portion of the tool 6 and tube 8 extends downwardly from the bottom of the pump barrel 7. The purpose of this tube will be further described. A tubular pump rod 9 is coupled to the drill pipe or tubing 5 and is provided with a piston 10 which may be reciprocated within the pump barrel 7 by reciprocating tubing 5 at the surface, thus providing a pumping action at the bottom of the well. The tube 8 has a packer 11 mounted thereon which engages the casing 1 at a point above the screen 2. Intake ports or holes 12 in the tube 8 above the packer 11 permit fluid to flow inwardly into the tube 8 from the casing 1. This fluid is either pumped or gravitated into the casing from the surface. At the lower end of the tube 8 I provide a pair of spaced packers 13—14, one packer being faced upwardly and the other downwardly so that fluid will be confined between the packers. The tube 8 is provided with a number of holes 15 between the packers 13—14 through which fluid under pressure can pass outwardly for the purpose of cleaning or washing the holes or perforations 16 in the screen 2. A return pipe or conduit 17 extends into the bottom of the tube 8 through the packing 18, thus the return conduit 17 can move vertically within the tube or the tube can be moved relative to the conduit as will be subsequently described. A retainer packer 19 of any usual and well known type as shown in Patent No. 2,073,107, Figures 4 and 5 is mounted within the portion 4 of the screen 2 substantially as shown. This packer may be of any type which will pack off with the conduit 17 and also permit the conduit to be latched thereto. This retainer packer 19 includes a ring packing 19' which bears against the pipe 4. The retainer 19 is provided with segmental or latched threads 20 and the conduit 17 is provided with matching threads 21 so that the conduit can be releasably attached to the retainer packer 19. The conduit 17 can be rotated to engage the threads 20—21, since the conduit is frictionally coupled to the tube 8 by means of the packing 18 which engages both the tube and the conduit. The tube 8, in turn, is attached to the drill pipe 5 and, therefore, the tube 8 can be rotated from the surface in the usual and well known manner employed in the drilling of a well. The conduit 17 is also provided with a ring seat 22 which rests on and seals at the upper end of the packer 19. When the threads 21 are engaged the seat 22 prevents fluid from flowing downwardly into the retainer 19. Packing rings 23 on the conduit 17 engage and seal against the inner wall of the packer 19. The retainer packer 19 is always in position during the producing operation of the well. However, if desired, a less expensive type of retainer packer could be employed, that is, it could be made of less expensive materials if the retainer 19 were removed. In any event, a suitable retainer packer 19 would always be in position in the well. A perforated shoe 24 on the lower end of the conduit 17 projects below the packer 19 and thus receives the flow from the annulus 3 permitting the wash fluid to pass upwardly through the conduit and thence to the surface. A packer 25 on the upper end of the conduit 17 seals off against the wall of the tube 8 above the ports 12 so that the return fluid can move above this packer 25 and thence upwardly through the tube 8 and into the pump portion of the rod 9 and eventually to the surface through the drill pipe or tubing 5. A check valve 25' may be provided on the upper end of the conduit 17 to prevent downward flow of fluid.

In Figure 3 I have eliminated the pump barrel 7 and the tube 8 is connected directly to the drill pipe or tubing 5 substantially as shown.

The pump barrel 7 as shown in Figures 1 and 2 may be employed for the purpose of reducing pressures in the tube 8 and if this pump barrel is thus used, i.e., if the drill pipe or tube 5 is reciprocated to actuate the piston 10, then the pump barrel 7 may be held stationary within the casing 1 by the slips 26 which are set by releasing the spring fingers 27 mounted on the outside of the barrel 7. This construction of the slips 26 and the method of setting them is usual and well known in the art as disclosed in one form in Patent No. 1,514,585. Outlet holes 10' are provided in the upper part of the barrel 7 to allow fluid to flow upwardly in the pipe 1. Reciprocation of the piston 10 will create a reduced pressure in the tube 8 and the upward flow of fluid in the pipe 1 will reduce the static pressure in that pipe. A ball check 9' is provided in the bottom of the rod 9 to prevent back flow of fluid from the tubular rod 9.

In operation

The retainer 19 has been set in the lower end 4 of the screen 2 and the flap valve 19a on the retainer is closed. My wash tool is now run into the casing 1 and lowered until the packer 11 is just above the screen 2. The conduit 17 is now coupled to the retainer 19 by the threads 21 and the seat 22 engages the top of the retainer as shown and seals off at this point. The packing cups 13—14 are now positioned within the screen 2. By raising the drill pipe or tubing 5 it is possible to raise the tube 8 upon which the cups 13—14 are mounted to move these cups over all of the perforations in the screen 2. Thus it is possible to move these cups from the bottom of the top of the perforated or screen area 2. The tube 8 can be raised as required from the surface, because this tube is attached to the drill pipe 5. The drill pipe and, therefore, the tube 8 can always be moved vertically since it hangs freely in the well. Fluid under pressure is introduced at the surface and moves downwardly in the casing 1, passing through the ports 12, thence downwardly in the tube 8 and out through the holes 15 where it passes through the perforations 16 to clean them. Any solid material which is obstructing the holes 16 will be carried downwardly in the annulus 3 and thence through the perforations in the shoe 24 and returns upwardly through the conduit 17 and the pipe 5 to the surface. Thus the return fluid with its entrained solids does not return through the perforations 16 which are to be cleaned but moves to the bottom of the bored hole and returns to the surface through a separate path, thus eliminating the possibility of re-clogging or obstructing the perforations in the pipe or screen 2. The returning fluid when it moves upwardly through the conduit 17 passes the check valve 25' and then moves into the tube 8 and into the pump barrel 7. While it is not essential to the operation of the tool, it is possible to reciprocate the piston 10 while the perforations are being cleaned. This reciprocation of the piston will somewhat assist the upward flow of fluid past the check valve 9' and it will also somewhat reduce the static pressure in the pipe 1, if this should be desirable. It is to be understood that the slips 26 which engage the pipe 1 can always be moved upwardly; the slant of the teeth of the slips permits this. Consequently, before the slips are ever set the tube 8 is lowered to the bottom of the screen portion of the pipe and thereafter is lifted gradually from the bottom to the top of that screen. Since the barrel 7 can be moved upwardly even though the slips 26 are set the tube 8 can then always be moved upwardly which carries with it the washing cups 15 and the washing operation as described.

Having described my invention, I claim:

1. In an oil well including a casing, a perforated pipe section at the lower end of the casing, said oil well having an annular space around the perforated pipe and extending to the bottom of said perforated pipe, a clean out tool comprising a packing means mounted in said perforated pipe section and below the perforations thereof, a conduit extending vertically through said packing means, means releasably coupling said conduit to said packing means, a tube extending over the conduit and spaced therefrom and reciprocable with relation to the conduit, another packer on said tube engaging the casing, said tube having ports therein above the last named packer, a packer on the conduit fitting in said tube above said ports, a pair of spaced packers on the tube adjacent the lower end thereof, said spaced packers engaging the perforated pipe, said tube having outlet holes therein positioned between said pair of spaced packers, and a perforated shoe on the lower end of said conduit, said shoe being positioned below the packing means to receive fluid from the annular space.

2. In an oil well including a casing, a perforated pipe section at the lower end of the casing, said oil well having an annular space around the perforated pipe and extending to the bottom of said perforated pipe, a clean out tool comprising a packing means mounted in said perforated pipe section and below the perforations thereof, a conduit extending vertically through said packing means, means releasably coupling said conduit to said packing means, a tube extending over the conduit and spaced therefrom and reciprocable with relation to the conduit, another packer on said tube engaging the casing, said tube having ports therein above the last named packer, a packer on the conduit fitting in said tube above said ports, a pair of spaced packers on the tube adjacent the lower end thereof, said spaced packers engaging the perforated pipe, said tube having outlet holes therein positioned between said pair of spaced packers, and a perforated shoe on the lower end of said conduit, said shoe being positioned below the packing means to receive fluid from the annular space, a pump barrel positioned above said tube and communicating therewith, a tubular pump rod extending into the pump barrel, and a piston on said pump rod within said pump barrel.

3. In an oil well including a casing, a perforated pipe section at the lower end of the casing, said oil well having an annular space around the perforated pipe and extending to the bottom of said perforated pipe, a clean out tool comprising a packing means mounted in said perforated pipe section and below the perforations thereof, a vertical conduit, a ring seat on the conduit, seating on the packing means, means releasably coupling said conduit to said packing means, a tube extending over the conduit and spaced therefrom and reciprocable with relation to the conduit, a packer on the tube engaging the casing, said tube having ports therein above said packer, a packer on the conduit fitting in said tube above said ports, a pair of spaced packers on the tube adjacent the lower end thereof, said spaced packers engaging the perforated pipe, said tube having outlet holes therein positioned between said last named spaced packers, and a perforated shoe on the lower end of said conduit, said shoe being positioned below said packing means to receive fluid from the annular space.

4. In an oil well including a casing, a perforated pipe section at the lower end of the casing, said oil well having an annular space around the perforated pipe and extending to the bottom of said perforated pipe, a clean out tool comprising a packing means mounted in said perforated pipe section and below the perforations thereof, a vertical conduit, a ring seat on the conduit, seating on the packing means, means releasably coupling said conduit to said packing means, a tube extending over the conduit and reciprocable with relation to the conduit and spaced therefrom, a packer on the tube engaging the casing, said tube having ports therein above said packer, a packer on the conduit fitting in said tube above said ports, a pair of spaced packers on the tube adjacent the lower end thereof, said spaced packers engaging the perforated pipe, said tube having outlet holes therein positioned between said last named spaced packers, and a perforated shoe on the lower end of said conduit, said shoe being positioned below said packing means to receive fluid from the annular space, a pump barrel positioned above said tube and communicating therewith, a tubular pump rod extending into the pump barrel, and a piston on said pump rod within said pump barrel.

5. In an oil well including a casing, a perforated pipe section at the lower end of the casing, said oil well having an annular space around the perforated pipe and extending to the bottom of said perforated pipe, a clean out tool comprising a retainer packer mounted in the perforated pipe section and below the perforations thereof, a conduit extending vertically through the retainer packer, latch means on the retainer packer engaging the conduit to releasably secure said conduit in the retainer packer, a tube extending over the conduit and space therefrom and reciprocable with relation to the conduit, a packing in the tube engaging the conduit, a packer on the tube engaging the casing, said tube having ports therein above said last named packer, a packer on the upper end of said conduit fitting in said tube and above said ports, a pair of spaced packers on the lower end of said tube, said spaced packers engaging the perforated pipe, said tube having outlet holes therein positioned between said spaced packers and a perforated shoe on the lower end of said conduit, said shoe being positioned below the retainer packer to receive fluid from the annular space.

6. In an oil well including a casing, a perforated pipe section at the lower end of the casing, said oil well having an annular space around the perforated pipe and extending to the bottom of said perforated pipe, a clean out tool comprising a retainer packer mounted in the perforated pipe section and below the perforations thereof, a conduit extending vertically through the retainer packer, latch means on the retainer packer engaging the conduit to releasably secure said conduit in the retainer packer, a tube extending over the conduit and spaced therefrom and reciprocable with relation to the conduit, a packing in the tube engaging the conduit, a packer on the tube engaging the casing, said tube having ports therein above said last named packer, a packer on the upper end of said conduit fitting in said tube and above said ports, a pair of spaced packers on the lower end of said tube, said spaced packers engaging the perforated pipe, said tube having outlet holes therein positioned between said spaced packers and a perforated shoe on the lower end of said conduit, said shoe being positioned below the retainer packer to receive fluid from the annular space, a pump barrel positioned above said tube and communicating therewith, a tubular pump rod extending into the pump barrel, and a piston on said pump rod within said pump barrel.

7. In an oil well including a casing, a perforated pipe section at the lower end of the casing, said oil well having an annular space around the perforated pipe and extending to the bottom of said perforated pipe, a clean out tool comprising a packing means mounted in said perforated pipe section and below the perforations thereof, a conduit extending vertically through said packing means, means releasably coupling said conduit to said packing means, a tube extending over the conduit and spaced therefrom and reciprocable with relation to the conduit, another packer on said tube engaging the casing, said tube having ports therein above the last named packer, a packer on the conduit fitting in said tube above said ports, a pair of spaced packers on the tube adjacent the lower end thereof, said spaced packers engaging the perforated pipe, said tube having outlet holes therein positioned between said pair of spaced packers, and a perforated shoe on the lower end of said conduit, said shoe being positioned below the packing means to receive fluid from the annular space, a pump barrel positioned above said tube and communicating therewith, a tubular pump rod extending into the pump barrel, a piston on said pump rod within said pump barrel, and casing engaging slips on the outside of said pump barrel.

8. In an oil well including a casing, a perforated pipe section at the lower end of the casing, said oil well having an annular space around the perforated pipe and extending to the bottom of said perforated pipe, a clean out tool comprising a retainer packer mounted in the perforated pipe section and below the perforations thereof, a conduit extending vertically through the retainer packer, latch means on the retainer packer engaging the conduit to releasably secure said conduit in the retainer packer, a tube extending over the conduit and spaced therefrom and reciprocable with relation to the conduit, a packing in the tube engaging the conduit, a packer on the tube engaging the casing, said tube having ports therein above said last named packer, a packer on the upper end of said conduit fitting in said tube and above said ports, a pair of spaced packers on the lower end of said tube, said spaced packers engaging the perforated pipe, said tube having outlet holes therein positioned between said spaced packers and a perforated shoe on the lower end of said conduit, said shoe being positioned below the retainer packer to receive fluid from the annular space, a pump barrel positioned above said tube and communicating therewith, a tubular pump rod extending into the pump barrel, a piston on said pump rod within said pump barrel, and casing engaging slips on the outside of said pump barrel.

References Cited in the file of this patent

UNITED STATES PATENTS

| 2,512,801 | Kinney et al. | June 27, 1950 |
| 2,675,880 | Baker | Apr. 20, 1954 |